United States Patent [19]

Christe et al.

[11]  4,172,881

[45]  Oct. 30, 1979

[54] DISPLACEMENT REACTION FOR PRODUCING NF$_4$PF$_6$

[75] Inventors: Karl O. Christe, Calabasas; Carl J. Schack, Chatsworth, both of Calif.

[73] Assignee: Rockwell International Corporation, El Segundo, Calif.

[21] Appl. No.: 849,377

[22] Filed: Nov. 7, 1977

Related U.S. Application Data

[63] Continuation-in-part of Ser. No. 732,275, Oct. 14, 1976, abandoned.

[51] Int. Cl.$^2$ .............................................. C01B 25/10
[52] U.S. Cl. .................................... 423/301; 423/351; 149/119

[58] Field of Search ....................... 423/301, 293, 351; 149/119

[56]  References Cited

PUBLICATIONS

Christe et al., Annual Report-Inorganic Halogen Oxidizer Research, 1/26/76, pp. A-1 to A-4, A-10 to A-13, A-25, Cover Page.

Primary Examiner—O. R. Vertiz
Assistant Examiner—Thomas W. Roy
Attorney, Agent, or Firm—L. Lee Humphries; Robert M. Sperry

[57]  ABSTRACT

A method of producing NF$_4$PF$_6$ by a displacement reaction between NF$_4$BF$_4$ and PF$_5$.

1 Claim, No Drawings

DISPLACEMENT REACTION FOR PRODUCING NF₄PF₆

The invention herein described was made in the course of or under a contract or subcontract thereunder, (or grant) with the United States Navy.

CROSS-REFERENCE TO RELATED APPLICATIONS

This application is a continuation-in-part of Ser. No. 732,275 filed Oct. 14, 1976, and abandoned Dec. 5, 1977, now abandoned.

BACKGROUND OF THE INVENTION

1. Field of the Invention

This invention relates to methods of producing compositions and is particularly directed to a method of producing $NF_4PF_6$ by a displacement reaction between $NF_4BF_4$ and $PF_5$.

2. Description of the Prior Art $NF_4{}^+$ salts are the key ingredients for solid propellant $NF_3$—$F_2$ gas generators, such as that disclosed by D. Pilipovich in U.S. Pat. No. 3,963,542, for chemical HF-DF lasers. Whereas $NF_4SbF_6$ and $NF_4AsF_6$ can be prepared with relative ease, according to the methods taught by W. E. Tolberg et al, in U.S. Pat. No. 3,708,570, and K. O. Christe et al, in U.S. Pat. No. 3,503,719, these compounds suffer from the disadvantage of containing a relatively heavy anion, thus decreasing their performance in an $NF_3$—$F_2$ gas generator. This disadvantage can be overcome by replacing the $SbF_6{}^-$ or $AsF_6{}^-$ anion by the lighter $PF_6{}^-$ anion. The existence of this salt has previously been claimed by Tolbert et al in U. S. Pat. No. 3,708,570, but their production process was so inefficient that they could not isolate an amount of material sufficient for its isolation, identification and characterization.

BRIEF SUMMARY AND OBJECTS OF THE INVENTION

This problem of synthesizing $NF_4PF_6$ is overcome by the present invention. The method of the present invention involves a displacement reaction between the readily available $NF_4BF_4$ and $PF_5$ according to:

$$NF_4BF_4 + PF_5 \rightarrow NF_4PF_6 + BF_3$$

Applicants have found that the displacement reaction can be carried out at any temperature above the melting point of $PF_5$ ($-94°$ C.) and below the decomposition temperature of $NF_4PF_6$ (above $245°$ C.). Moreover, the pressure is not essential and is given by the reaction temperature (that is, the vapor pressure of $PF_5$).

This method provides $NF_4PF_6$ of high purity.

Accordingly, it is an object of the present invention to provide an improved process for the production of $NF_4PF_6$.

This and other objects and features of the present invention will be apparent from the following examples.

DETAILED DESCRIPTION OF THE INVENTION

In a typical experiment, pure $NF_4BF_4$ (2.07 mmol) was combined at $-196°$ C. with an excess of $PF_5$ (40.01 mmol) in a 10-ml 316 stainless steel cylinder. The mixture was kept at $25°$ C. for 64 h. The volatile materials were removed in vacuo and separated by fractional condensation. They consisted of $BF_3$ (2.05 mmol) and unreacted $PF_5$ (37.93 mmol). The white solid residue had gained 120 mg in weight. Based on the above material balance, the conversion of $NF_4BF_4$ to $NF_4PF_6$ was essentially complete. This was further confirmed by vibrational spectroscopy which showed the solid to be $NF_4PF_6$ containing no detectable amounts of $NF_4BF_4$.

The salt $NF_4PF_6$ is a white, crystalline, hydroscopic solid, stable at room temperature, but rapidly decomposing at $245°$ C. Its characteristic x-ray diffraction powder pattern is listed in Table I. Its vibrational spectrum is listed in Table II and establishes the ionic nature of the salt, i.e. the presence of discrete $NF_4{}^+$ cations and $PF_6{}^-$ anions. This was further confirmed by $^{19}F$ nmr spectroscopy in HF solution which showed the triplet ($J_{NF} = 230$ Hz at $\phi = -217$) characteristic for $NF_4{}^+$.

TABLE I

X-RAY POWDER DATA FOR $NF_4PF_6{}^a$

| d obsd | d calcd | Int | h k l |
|---|---|---|---|
| 5.40 | 5.36 | ms | 1 1 0 |
| 4.55 | 4.53 | s | 1 0 1 |
| 3.91 | 3.89 | vs | 1 1 1 |
| 3.79 | 3.79 | s | 2 0 0 |
| 2.91 | 2.91 | ms | 2 1 1 |
| 2.65 | 2.65 | m | 1 0 2 |
| 2.40 | 2.40 | vw | 3 1 0 |
| 2.307 | 2.305 | m | 3 0 1 |
| 2.204 | 2.205 | vw | 3 1 1 |
| 2.171 | 2.171 | mw | 2 1 2 |
| 1.882 | 1.883 | ms | 3 0 2,0 0 3 |
| 1.825 | 1.827 | vw | 3 1 2,1 0 3 |
| 1.784 | 1.785 | w | 3 3 0 |
| 1.747 | 1.747 | mw | 4 1 1 |
| 1.685 | 1.685 | w | 3 2 2,2 0 3 |
| 1.646 | 1.646 | w | 2 1 3 |
| 1.622 | 1.622 | w | 4 2 1 |
| 1.536 | 1.540 | vw | 4 1 2 |
| 1.485 | 1.486 | vw | 5 1 0 |
| 1.464 | 1.463 | vw | 5 0 1 |
| 1.437 | 1.437 | w | 5 1 1 |
| 1.408 | 1.407 | vw | 5 2 0 |
| 1.365 | 1.365 | vw | 5 2 1,1 1 4 |
| 1.333 | 1.335 | w | 5 0 2 |
| 1.318 | 1.319 | vw | 4 4 0 |
| 1.302 | 1.304 | vw | 2 1 4 |
| 1.259 | 1.259 | w | 4 2 3 |
| 1.214 | 1.216 | w | 6 1 1 |

$^a$Tetragonal, a = 7.577, c = 5.653A, Cu K$_\alpha$ radiation Ni filter

TABLE II

VIBRATIONAL SPECTRUM OF $NF_4PF_6$

| Obsd Frequency (cm$^{-1}$) | | Assignments for $NF_4{}^+(T_d)$ |
|---|---|---|
| Ir | Raman | |
| 2380 vw <br> 2320 w | | $2\nu_3(A_1 + E + F_2) = 2320$ |
| 2005 w | | $\nu_1 + \nu_3(F_2) = 2008$ |
| 1765 w | | $\nu_3 + \nu_4 (A_1 + E + F_2) = 1769$ |
| 1457 w | | $\nu_1 + \nu_4(F_2) = 1457$ |
| 1221 mw | | $2\nu_4(A_1 + E + F_2) = 1218$ |
| 1166 vs | 1168(1.5) <br> 1150(0.8) | $\nu_3(F_2)$ |
| 1135 vw | | |
| 1056 vw | | $\nu_2 + \nu_4(F_1 + F_2) = 1049$ |
| | 880(0.2) | $2\nu_2(A_1 + A_2 + E) = 880$ |
| | 849(8.2) | $\nu_1(A_1)$ |
| 611 m | 609(7.4) | $\nu_4(F_2)$ |
| 608 m | 441(2.9) | $\nu_2(E)$ |

TABLE II-continued

VIBRATIONAL SPECTRUM OF $NF_4PF_6$

|  |  | Assignments for $PF_6^-$ ($O_h$) |
|---|---|---|
| 1590 w |  | $\nu_1 + \nu_3(F_{1u}) = 1590$ |
| 1414 w |  | $\nu_2 + \nu_3(F_{1u} + F_{2u}) = 1413$ |
| 1308 vw |  | $\nu_1 + \nu_4(F_{1u}) = 1307$ |
| 842 vs } 789 w | 838(1.5) | $\nu_3(F_{1u})$ |
| 749 w | 748(10) | $\nu_1(A_{1g})$ |
|  | 571(0.8) | $\nu_2(E_g)$ |
| 559 s |  | $\nu_4(F_{1u})$ |
| 474 vw } | 469(1.2) | $\nu_5(F_{2g})$ |

Obviously, numerous variations and modifications may be made without departing from the present invention. Accordingly, it should be clearly understood that the form of the present invention described above is illustrative only and is not intended to limit the scope of the present invention.

We claim:

1. A process for the production of $NF_4PF_6$ characterized by combining $NF_4BF_4$ with an excess of $PF_5$ at above about $-196°$ C., reacting the reactants while warming the reaction system to a temperature less than about 25° C. and removing the volatile reaction products by pumping.

* * * * *